United States Patent [19]

Stewart

[11] Patent Number: 5,163,324
[45] Date of Patent: Nov. 17, 1992

[54] BUBBLER LIQUID LEVEL SENSING SYSTEM

[75] Inventor: Glen A. Stewart, Grand Blanc, Mich.

[73] Assignee: General Motors Corporation, Detroit, Mich.

[21] Appl. No.: 840,203

[22] Filed: Feb. 24, 1992

[51] Int. Cl.$^5$ ............................................. G01F 23/18
[52] U.S. Cl. ........................................ 73/302; 73/301
[58] Field of Search ........................... 73/299, 301, 302

[56] References Cited

U.S. PATENT DOCUMENTS

| | | | |
|---|---|---|---|
| 2,604,778 | 7/1952 | Marquardt | 73/302 |
| 3,023,619 | 3/1962 | Sandford | 73/302 |
| 3,200,971 | 8/1965 | Trethewey | 73/302 |
| 3,620,085 | 11/1971 | Khoi | 73/302 |
| 3,987,675 | 10/1976 | Harrison | 73/302 |
| 4,639,738 | 1/1987 | Young et al. | 73/302 |
| 4,669,309 | 6/1987 | Cornelius | 73/302 |
| 4,711,127 | 12/1987 | Hafner | 73/302 |
| 5,005,408 | 4/1991 | Glassey | 73/299 |
| 5,090,242 | 2/1992 | Hilton | 73/302 |

FOREIGN PATENT DOCUMENTS

| | | | |
|---|---|---|---|
| 0337127 | 2/1904 | France | 73/302 |
| 0072314 | 6/1981 | Japan | 73/302 |
| 0155317 | 9/1983 | Japan | 73/302 |
| 0073732 | 4/1984 | Japan | 73/302 |

Primary Examiner—William A. Cuchlinski, Jr.
Assistant Examiner—Diego F. F. Gutierrez
Attorney, Agent, or Firm—Anthony Luke Simon

[57] ABSTRACT

A bubbler liquid level sensing apparatus comprises a liquid storage tank with a vapor region and a fluid region and first and second sensing tubes exposed to the vapor region and fluid region, respectively. A pump with an inlet and an outlet is included, the inlet is pneumatically coupled to the first sensing tube and the outlet is pneumatically coupled to the second sensing tube. First and second controllable valves each have a first input. The first input of the first controllable valve is pneumatically coupled to the first sensing tube and the first input of the second controllable valve is pneumatically coupled to the second sensing tube. The first and second controllable valves each also have a second input pneumatically coupled to the atmosphere, wherein each of the controllable valves has an output that is selectively pneumatically coupled to either the first input or second input of said valve. A transducer is coupled to the outputs of the first and second controllable valve so that the transducer may be selectively coupled either to the atmosphere or the sensing tubes.

12 Claims, 3 Drawing Sheets

BUBBLER LIQUID LEVEL SENSING SYSTEM

This invention relates to liquid level measurement systems and more particularly to pressure based bubbler liquid level sensing systems.

BACKGROUND OF THE INVENTION

New and improved methods are constantly sought for measuring levels of liquids in storage tanks, whether those tanks be in a fixed location or in a movable object such as a motor vehicle. Benefits sought from new methods include increased system sensitivity and precision, improved reliability and elimination of moving parts in the liquid tank. One such system is a pressure based bubbler system.

In a pressure based bubbler system, a pressure transducer measures the pressure difference between the bottom of the liquid tank and either atmospheric pressure or the vapor region in the tank. An air pump forces the air into a tube which is at one point connected to the pressure transducer and at another point open in the bottom of the liquid tank. The air bubbles out of the tube at the bottom of the liquid tank to prevent fluid in the tank from traveling up the tube. Hence, the term "bubbler".

Improvements yet sought in these types of systems include increased durability and minimum invasiveness into the fluid tank.

SUMMARY OF THE INVENTION

This invention provides a liquid level measuring system suitable for use in both static tanks and tanks in vehicles. This invention is capable of providing a high resolution precise output signal indicative of the level of liquid in the tank, a system with an improved life-span and a system with minimum intrusiveness into the environment of the liquid tank.

Advantageously, an improvement of this invention for use in fuel tanks is the isolation of the transducer from fuel and fuel vapors that, in conventional systems, would eventually cause transducer failure.

Advantageously, this invention provides a closed system operation in which the liquid storage tank is isolated from the outside atmosphere.

Advantageously, this invention provides a liquid storage tank with a vapor region and a fluid region, a first sensing tube in the vapor region of the tank and a second sensing tube in the fluid region of the tank. A pump, with an inlet that is pneumatically connected to the first sensing tube and an outlet pneumatically connected to the second sensing tube, pumps air from the vapor region into the second sensing tube. A pressure transducer has two pneumatic inputs pneumatically connected to outputs of first and second controllable valves. The first controllable valve has first and second inputs pneumatically coupled to the first sensing tube and atmosphere, respectively. The second controllable valve has first and second inputs pneumatically coupled to the second sensing tube and atmosphere, respectively. The first and second valves may be controllably switched to couple the transducer to the first and second sensing tubes or to the atmosphere.

A more detailed description of this invention and the advantages recited herein is set forth below.

DETAILED DESCRIPTION OF THE INVENTION

Figure 1:
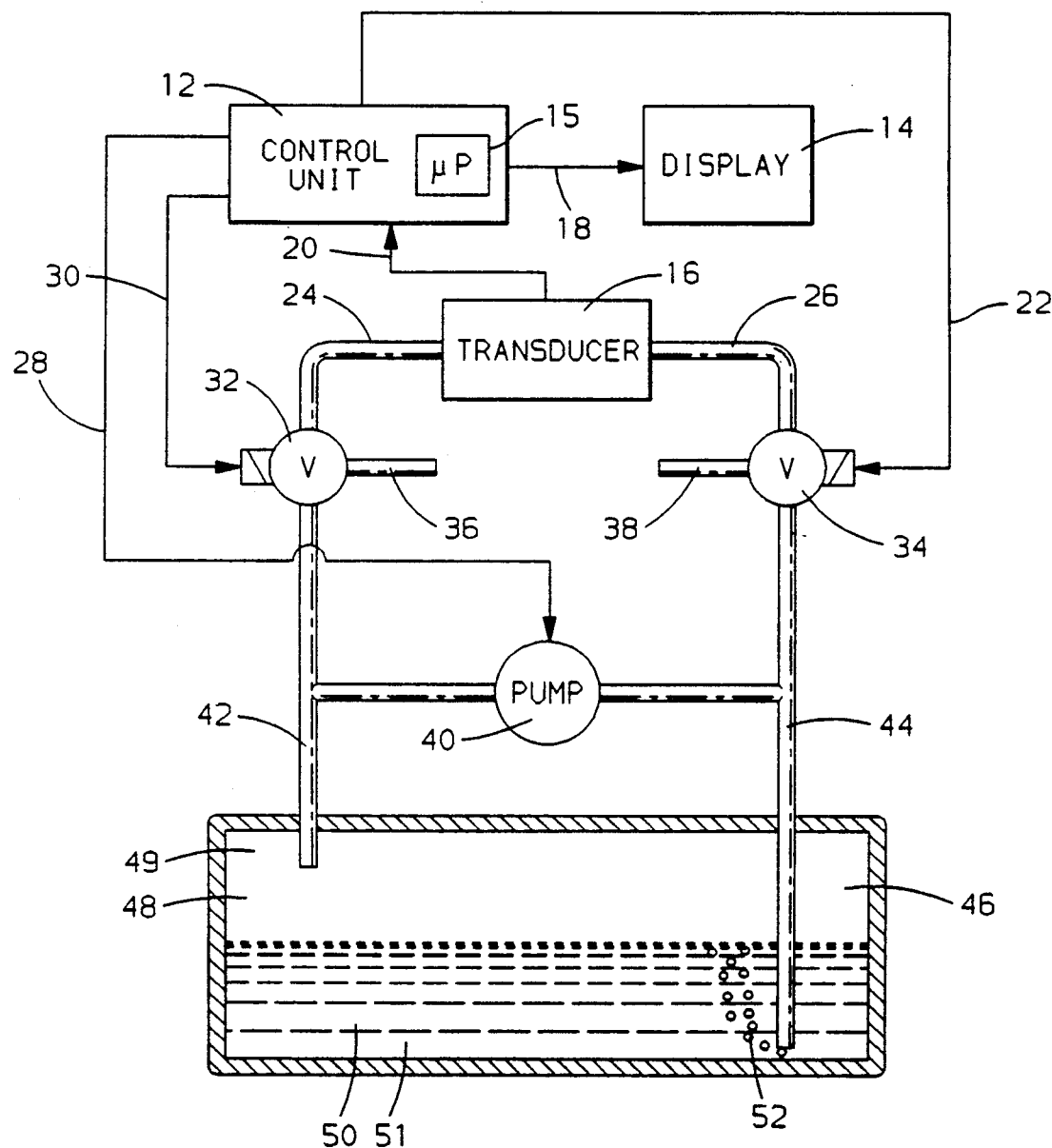
FIG. 1 is an illustration of the apparatus of this invention.

Referring to FIG. 1, tank 46, which may be a vehicle fuel tank, has a vapor region 48 with air and fluid vapor 49 and a fluid region 50 occupied by fluid 51 such as vehicle fuel. A first sensing tube 42 is exposed to the vapor region 48 of the tank 46 and is pneumatically coupled to the inlet of pump 40 and one inlet of valve 32. A second sensing tube 44 is exposed to the fluid portion 50 of the tank 46 proximate to the bottom of tank 46 and is pneumatically coupled to the outlet of pump 40 and one inlet of valve 34. Valves 32 and 34 have second inlets 36 and 38 exposed to the atmosphere.

The output of valve 32 is pneumatically coupled through tube 24 to one input of differential pressure transducer 16 and the output of valve 34 is pneumatically coupled through tube 26 to the other input of pressure transducer 16. Signals in control lines 30 and 22 control the switching of pneumatic valves 32 and 34 between one of their two respective inputs coupling only one input at a time to the output of each valve.

Pressure transducer 16 is a standard differential pressure transducer providing continuous output and is readily available to those skilled in the art. Control unit 12, which may include microprocessor 15, provides control of the pump 40 through line 28 and controls the valves 32 and 34 through lines 30 and 22. The control unit 12 receives a signal from pressure transducer 16 through line 20 indicative of the relative pressure differential provided to the two inputs of pressure transducer 16. When valves 32 and 34 are selectively controlled so that their inputs connected to the first and second sensing tubes 42 and 44 are coupled to the valve outputs at tubes 24 and 26 respectively, the differential pressure signal output from transducer 16 on line 20 is indicative of the measure of fluid in tank 46.

To prevent fluid from rising in sensing tube 44 and interfering with accurate measurement, pump 40 is controlled via line 28 during the measurement to pump air and vapor from the vapor region 48 through first sensing tube 42 and pump 40, into sensing tube 44 so that it bubbles out of tube 44, as shown by reference 52 in FIG. 1. When the air and vapor are bubbling out of tube 44, the pressure in tube 44 is equal to the pressure at the bottom of tank 46, which is in turn dependent upon fluid level in tank 46. This pressure is pneumatically coupled through valve 34 and tube 26 to transducer 16, which is selectively pneumatically coupled through valve 32 to vapor region 48. In this manner, the relative differential pressure at transducer 16 is indicative of the actual level of fluid in the tank and immune from affect by fluid entry in the tube 44. The control unit 12 receives the signal from line 20 and responsively provides an output signal on line 18 to drive the display 14 indicative of a level of fluid in the tank.

Since, in many situations, it is neither desirable nor necessary to continuously run pump 40 and detect a signal from transducer 16, pump 40 is only periodically run. During the off periods of pump 40, signals on lines 30 and 22 control valves 32 and 34 so that their second inputs 36 and 38 are pneumatically coupled to their outputs, venting both sides of transducer 16 and the tubes 24 and 26 to the atmosphere. In this manner, damaging vapors that may have been exposed to transducer 16 during the fluid level measurement process are vented to the atmosphere, reducing the transducer's exposure to the harmful vapors and providing increased life-span of transducer 16.

This invention, as described above, is particularly well suited for implementation into automotive vehicles. The measurement system described above requires no moving parts in the tank, eliminating the possibility of corroded or jammed floats mechanisms. Additionally, the sensing process does not introduce additional air into the tank so that vapor pressure regulation of fuel tanks, if used, is not interfered with. Additionally, the above described apparatus can be used for vapor pressure management as required in some vehicles. Sensing vapor pressure for vapor pressure management can be achieved by controlling valve 32 through line 30 so that sensing tube 42 is pneumatically coupled to the outlet of valve 32 and one of the inputs of transducer 16 while valve 34 is maintained in the position where the other input of transducer 16 is pneumatically coupled to the atmosphere via inlet 38. In this manner, the output signal transducer 16 on line 20 is indicative of the vapor pressure in tank 46 relative to atmospheric pressure.

Figure 2:
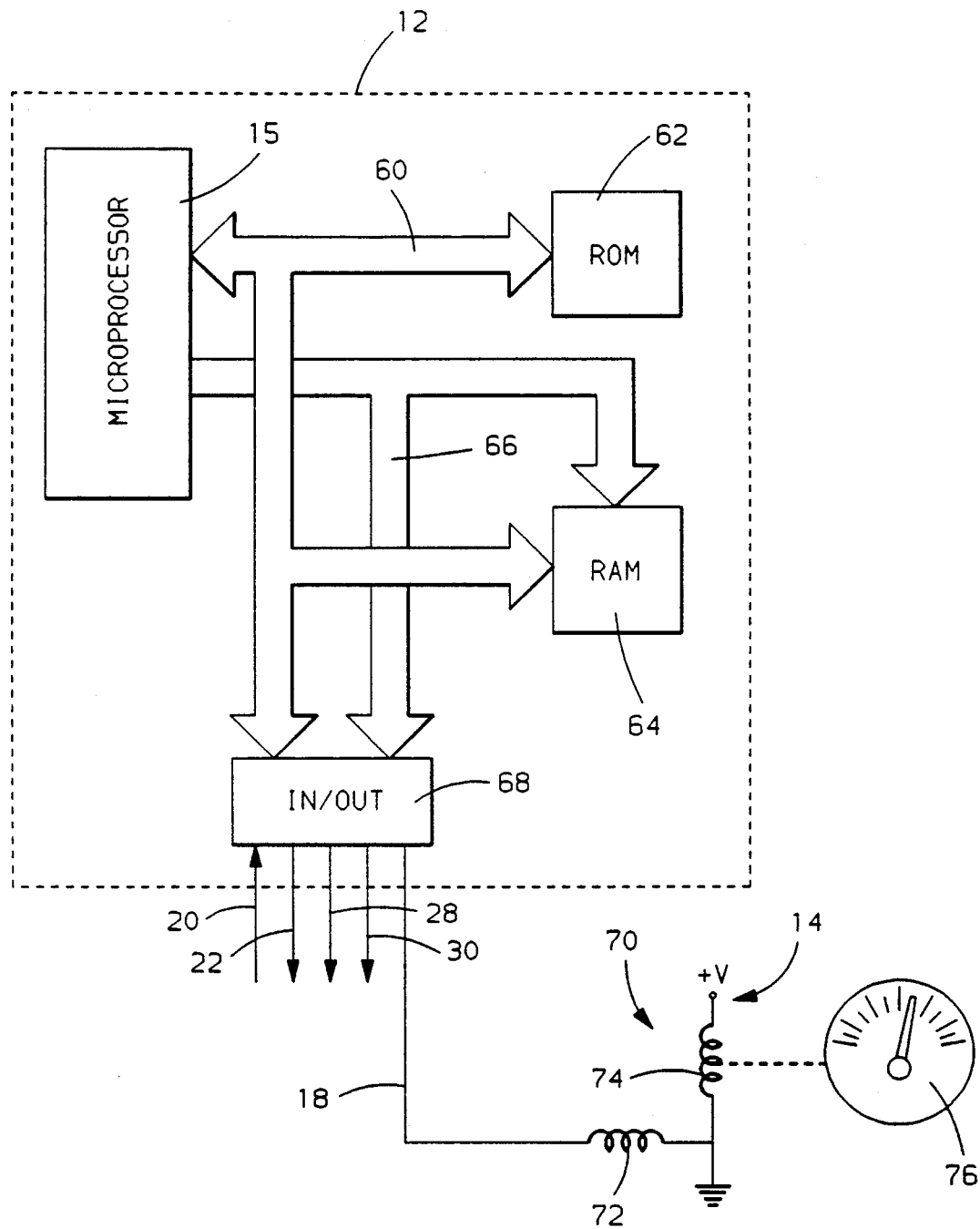
FIG. 2 is an illustration of an example control unit for use with this invention and a display for use with this invention.

The control unit 12 shown in FIG. 1 may be any type of suitable control unit including a control unit with fixed designated processing circuitry or a microprocessor based control unit. FIG. 2 shows an example microprocessor based control unit including microprocessor 15, read-only memory 62, random access memory 64 and input-output unit 68. In general, the microprocessor 15 runs a control program stored in memory 62 and provides commands to the memory 64 and input-output unit 68 through command bus 66 and transfers data among, to and from the units 62, 64 and 68 through bi-directional data bus 60. In response to the input signal on line 20 and the control routine, the output signals on lines 18, 22, 28 and 30 are provided.

Also shown in FIG. 2, the output signal on line 18 connected to display 14 comprising a conventional two-coil air core gage 70. Two-coil air core gage 70 has first and second coils 72 and 74, which in response to a signal on line 18 cause rotation of a magnetic rotor (not shown), which rotates pointer 76 to indicate the amount of liquid in the tank. In the case of an automotive implementation, the display 14 is a typical vehicle fuel gage. The signal on line 18 may optionally be connected to digital processing circuitry for use in a digital display.

Figure 3:
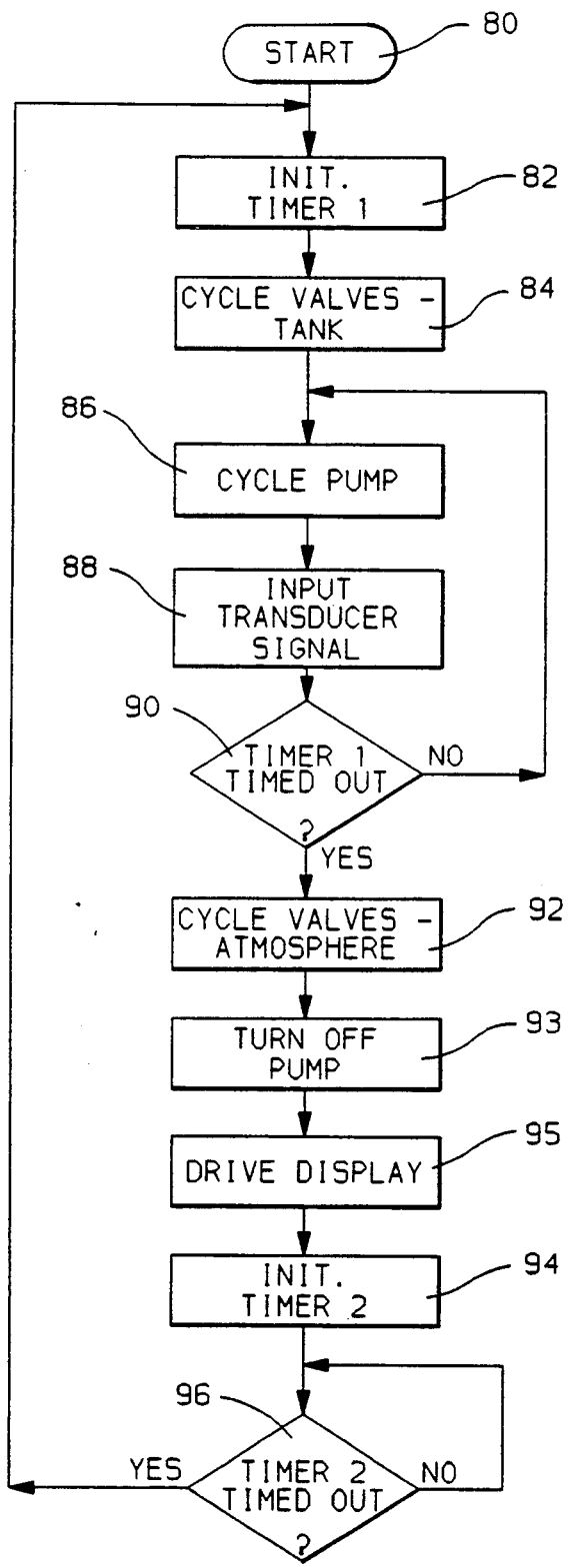
FIG. 3 is an example computer sub-routine for use by a control unit operating this invention.

Referring to FIG. 3, an example control routine for use with the apparatus described above when implemented in a vehicle fuel system is shown. The control routine preferably runs so that, at selected intervals, the valves 32 and 34 couple transducer 16 to the vapor and fluid regions of tank 46 for several seconds to get a reading on line 20. For example, every 500 seconds pump 40 is activated and valves 32 and 34 are selectively controlled so that transducer 16 is coupled to the vapor and fluid regions of tank 46.

The routine may be implemented as shown by starting at block 80, moving to block 82 where a first timer is initiated and then to block 84 where the valves 32 and 34 are selectively controlled through lines 32 and 22 coupling the transducer 16 to the vapor and fluid regions of tank.46. A command is then generated through line 26 to cycle pump 40 at block 86. At block 88, an input signal is received from transducer 16. At block 90, the first timer is tested to see if it has timed out. If not, the routine returns to block 86 to continue cycling pump 40 and monitor transducer 16 at block 88. When timer 1 times out, the routine moves to block 92 where it cycles valves 32 and 34 coupling the second inputs open to the atmosphere to the transducer 16 so that the transducer 16 may be vent into the atmosphere. At block 93, the pump 40 is turned off and at block 95 an output signal is provided on line 18 to drive display 14. At block 94, a second timer is initiated and the control unit waits until the second timer times out before making another measurement.

Many variations in addition to the above sub-routines may be added by those skilled in the art as the system may require. In one variation, a portion may be added to the sub-routine where valve 32 is cycled so that the pressure in the vapor region 48 of tank 46 may be measured with respect to atmospheric pressure as described above.

The above described implementations are example implementations of this invention. Moreover, various improvements and modifications to this invention may occur to those skilled in the art and such improvements and modifications will fall within the scope of this invention as defined below.

The embodiments of the invention in which an exclusive property or privilege is claimed are defined as follows:

1. An apparatus comprising:
   a liquid storage tank with a vapor region and a fluid region;
   first and second sensing tubes exposed to the vapor region and fluid region, respectively;
   a pump with an inlet and an outlet, the inlet pneumatically coupled to the first sensing tube and the outlet pneumatically coupled to the second sensing tube;
   first and second controllable valves, each having a first input, the first input of the first controllable valve pneumatically coupled to the first sensing tube and the first input of the second controllable valve pneumatically coupled to the second sensing tube, the first and second controllable valves each having a second input pneumatically coupled to the atmosphere, wherein each of the controllable valves has an output that is selectively pneumatically coupled to either the first input or the second input of said valve; and
   a transducer coupled to the outputs of the first and second controllable valves.

2. The apparatus set forth in claim 1 wherein the transducer provides an output signal indicative of a measure of fluid in the tank.

3. The apparatus set forth in claim 2 wherein a display indicates the measure of fluid in the tank responsive to the transducer output signal.

4. The apparatus set forth in claim 1 wherein the tank is an automotive fuel tank and the fluid in the tank is vehicle fuel.

5. The apparatus set forth in claim 1 also comprising a control unit for selectively activating the first and second valves and for selectively controlling the pump.

6. The apparatus set forth in claim 5 wherein the control unit implements a control program whereby for a first period of time the pump is activated and the first and second valves are selectively activated so that the first and second sensing tubes are pneumatically coupled to the transducer, and whereby during a second period of time, cyclically occurring after every first period, the pump is deactivated and the first and second valves are selectively controlled so that the transducer is coupled to the atmosphere.

7. The apparatus set forth in claim 5 wherein the control unit selectively activates the first and second controllable valves so that the transducer is pneumatically coupled to the vapor region and the atmosphere to measure a vapor pressure in the vapor region.

8. The apparatus set forth in claim 3 wherein the display is an air core gage.

9. The apparatus set forth in claim 8 wherein the tank is a vehicle fuel tank, the fluid in the tank is vehicle fuel and the display is a vehicle fuel gage.

10. The apparatus set forth in claim 1 also comprising a control unit with a microprocessor implementing a control program.

11. A liquid level measuring apparatus, comprising:
a tank with a first region substantially containing a liquid substance and a second region substantially containing a gaseous substance;
first and second sensing tubes exposed to the first and second regions, respectively;
a pump with an inlet and an outlet, the inlet pneumatically coupled to the first sensing tube and the outlet pneumatically coupled to the second sensing tube;
a differential pressure measuring device having first and second inlets; and
first and second controllable valves, each having first and second modes, wherein the first controllable valve, (i) in the first mode, pneumatically couples the first inlet of the pressure measuring device to the first sensing tube to and, (ii) in the second mode, pneumatically couples the first inlet of the pressure measuring device to outside atmosphere, wherein the second controllable valve, (i) in the first mode, pneumatically couples the second inlet of the pressure measuring device to the second sensing tube and, (ii) in the second mode, pneumatically couples the second inlet of the pressure measuring device to the outside atmosphere.

12. A device for measuring the level of liquid in a liquid storage tank, comprising:
first and second sensors disposed in a storage tank;
a differential pressure measuring device with a first input selectively coupled to the first sensor and a second input selectively coupled to the second sensor;
means for selectively coupling the first input of the differential pressure measuring device between the first sensor and an atmosphere, the first input being exposed to atmospheric pressure and vented to the atmosphere when coupled to the atmosphere; and
means for selectively coupling the second input of the differential pressure measuring device between the second sensor and the atmosphere, the second input being exposed to atmospheric pressure and vented to the atmosphere when coupled to the atmosphere.

* * * * *